April 30, 1957   M. N. MacKAY   2,790,909
CASSETTE RETAINER
Filed June 22, 1953
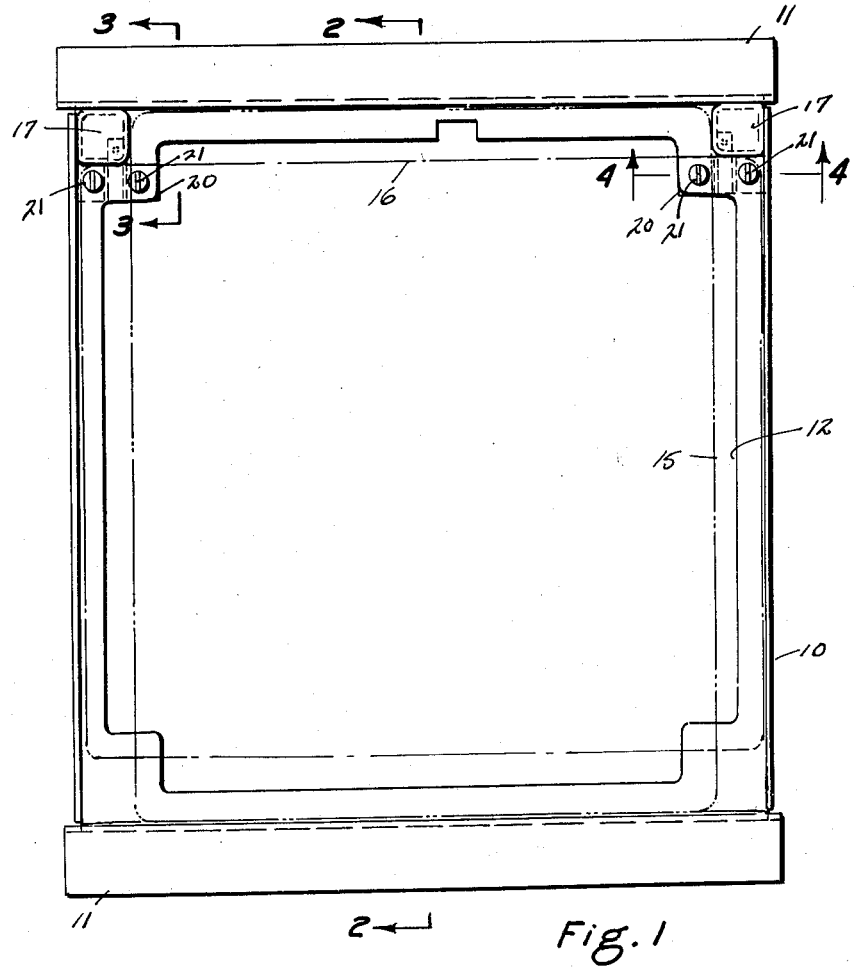
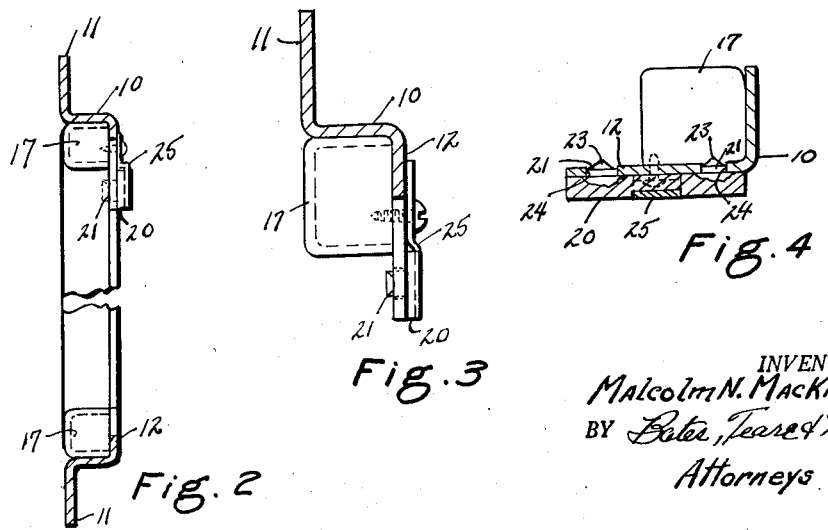
INVENTOR.
Malcolm N. MacKay
BY Peter, Teare & McKean
Attorneys

United States Patent Office 2,790,909
Patented Apr. 30, 1957

2,790,909

CASSETTE RETAINER

Malcolm N. MacKay, Medford, Mass., assignor to Picker X-Ray Corporation, Waite Mfg. Div. Inc., Cleveland, Ohio, a corporation of Ohio Application June 22, 1953, Serial No. 363,114

5 Claims. (Cl. 250—68)

This invention relates to improvements in a film carrier for X-ray apparatus and more particularly to improvements relating to the retention of film against displacement in the movable film carrier.

X-ray apparatus is usually designed for both fluoroscopic and radiographic examinations and includes a fluoroscopic screen housing which supports a movable film carrier adapted to be positioned into the screen area whenever the apparatus is to be used for radiographic examination. The film carrier may be manually or automatically positioned into and out of the screen area in any desired sequence of operation and may include an additional relatively movable tray for positioning film in a direction different from the main carrier movement within the screen housing, thereby permitting exposure of different areas of the film as desired. Suitable means are provided to stop the carrier or tray in predetermined exposure position so that the center of the portion of the film to be exposed will be in substantial alignment with the axis of the primary X-ray beam. The film is usually contained in a holder or cassette which may be freely inserted or removed from the tray or carrier.

One of the difficulties occurring in the movement of the carrier is the tendency for the cassette to jump out of the carriage whenever the carriage is brought to a sudden stop at the end of the return travel of the carriage.

Briefly, the invention contemplates the provision within a carrier of suitable magnets selectively mounted for holding a film cassette in any position within the carrier.

In the drawings, Fig. 1 is a top view of a film tray showing the disposition of the holding magnets therein;

Figs. 2, 3 and 4 are sectional views taken along the lines 2—2, 3—3 and 4—4 respectively in Fig. 1.

Referring to the drawings, Fig. 1 shows a film supporting carrier in the form of a shallow tray 10 having suitable flanges 11 at opposite raised edges thereof for engaging guides within a supporting carriage or fluoroscopic screen housing. The tray 10 actually has only marginal film supporting surfaces formed by the inwardly extending marginal flange 12 which bounds a central opening through which the film is exposed to the primary X-ray beam. The film is normally carried in a holder or cassette, not forming part of this invention and therefore not shown, which may be inserted into the shallow tray 10 in overlapping relation on the marginal flanges 12. The film usually used is longer than it is wide and hence the central opening in the tray 10 is shaped to receive a cassette with the long dimension of the film extending either longitudinally of the screen housing or transversely thereof. In the former position, the longitudinal edges of the cassette would be in position indicated by the broken lines 15 in Fig. 1 and when positioned transversely of the tray the long edges of the cassette would be indicated by the broken lines 16 in Fig. 1. Suitable guide blocks 17 are located within the corners of the shallow tray to enable the proper longitudinal or crosswise disposition of a cassette therein. The marginal flange 12 projects inward to a greater extent at the corners of the tray to accommodate the cassette in either position. Thus, a common portion of the flange 12 at each corner engages and supports the cassette in either position.

It is readily apparent that if the tray 10 is moved against a stop the film cassette is likely to be displaced by virtue of the engaging shock of the tray with the stop. To prevent such relative displacement and hold the cassette in proper relation within the tray at all times, suitable permanent magnets 20 are shown resiliently mounted at adjacent corners of the marginal flange 12 to magnetically attract and hold the film cassette in fixed relation therein. The magnets may be made from any material exhibiting permanent magnetic characteristics. We have found, for example, that the alloys of nickel, aluminum, iron and cobalt particularly grades designated Alnico V and V1, are satisfactory for this purpose. The magnets 20 are preferably in the form of an elongated bar having raised protuberances 21 spaced lengthwise which are ground in line to present ridges 23 for concentrating the magnetic flux at the desired location, as best shown in Figs. 3 and 4. The marginal flange 12 at adjacent corners of the tray is provided with spaced openings 24 for receiving the raised protuberances 21 of the magnets. One protuberance of each magnet extends through the aforementioned common portion of the flange 12 at each corner for magnetic coaction with the cassette in either position. A suitable leaf spring 25 is mounted underneath the marginal flange at each corner of the tray with a free end extending under the magnet bar 20 into a guide recess 25 where it is fastened to support the magnet in proper relation under the marginal flange 12 so that the magnetic protuberances 21 extend through the openings for magnetic coaction with the film cassette. The localized concentration of magnetic force and resilient mounting of the magnets enables a firm holding action of the cassette in the tray while readily permitting the cassette to be removed therefrom. The spacing of the magnet protuberances are such that the tray 10 is firmly held in place in either the longitudinal or crosswise positions within the tray.

I have shown and described what I consider to be the preferred embodiments of my invention but it will be obvious to those skilled in the art that other changes and modifications may be made without departing from the scope of my invention as defined by the appended claims.

I claim:

1. In a carrier for an oblong film cassette the combination comprising, a receptacle having an inwardly directed marginal flange defining a marginal supporting base surrounding a central opening larger than the width of the oblong cassette, said marginal flange projecting inwardly at adjacent corners to a greater extent than the remainder thereof, whereby a common portion of said flange at each such corner engages and supports the cassette in either a longitudinal or crosswise position, and a permanent magnet operably supported by the common portion of said flange at each such corner for magnetic coaction with the cassette in either position to hold the cassette against displacement therein.

2. The carrier of claim 1 wherein the common portion of the marginal flange at each such corner is provided with an opening and wherein each permanent magnet is provided with a protuberance adapted to extend freely through the corresponding opening, and means for resiliently supporting each of said magnets beneath the corresponding common portion of the flange with the protuberance extending through the corresponding flange opening for magnetic coaction with the adjacent portion of a cassette.

3. A carrier for a film cassette comprising in combination, a receptacle having a base adapted to freely support a cassette, said base having an opening, a permanent magnet having a raised protuberance formed to concentrate the magnetic force at its extremity and adapted to extend through and intersect the base opening to magnetically attract and hold the cassette in the receptacle, and means independently supporting said magnet beneath the base with the protuberance extending through the base opening, said means being resiliently flexible to permit relative movement of the magnet protuberance through the base opening.

4. The carrier of claim 3 wherein said last mentioned means includes a leaf spring having one end secured beneath the base adjacent the opening and having its free end engaging and supporting the magnet thereon.

5. A carrier for supporting a magnetically susceptible film cassette in each of two transverse positions relative to an X-ray beam comprising, a shallow receptacle having a base with an opening for access to the X-ray beam, said base having inwardly directed marginal flanges bounding the opening and upon which the film cassette is supported, and a permanent magnet movably supported beneath the marginal flange in predetermined relation to each of the cassette positions adjacent the base opening, resilient means coacting therewith to bias the magnet upwardly with a portion thereof intersecting the plane of the base opening to engage and magnetically attract and hold a film cassette in either position thereon.

References Cited in the file of this patent

UNITED STATES PATENTS

| | | |
|---|---|---|
| 1,624,741 | Leppke | Apr. 12, 1927 |
| 1,677,919 | Hansen | July 24, 1928 |
| 2,005,035 | Houtman | June 18, 1935 |
| 2,184,962 | Scholz | Dec. 26, 1939 |
| 2,457,032 | Case | Dec. 21, 1948 |
| 2,590,891 | Reuter | Apr. 1, 1952 |
| 2,660,969 | Woolford et al. | Dec. 1, 1953 |